United States Patent [19]
Seymour

[11] Patent Number: 5,706,154
[45] Date of Patent: Jan. 6, 1998

[54] RESIDENTIAL CIRCUIT BREAKER WITH ARCING FAULT DETECTION

[75] Inventor: Raymond K. Seymour, Plainville, Conn.

[73] Assignee: General Electric Company, New York, N.Y.

[21] Appl. No.: 726,895

[22] Filed: Oct. 4, 1996

[51] Int. Cl.[6] ............................................. H02H 3/00
[52] U.S. Cl. ...................... 361/42; 361/102; 361/105; 335/23; 335/201
[58] Field of Search ............................. 361/42–45, 93, 361/94, 99, 102, 103, 105, 170; 335/23–25, 31, 35, 201; 336/221

[56] References Cited

U.S. PATENT DOCUMENTS

| | | | |
|---|---|---|---|
| 4,513,268 | 4/1985 | Seymour et al. | 335/35 |
| 5,307,230 | 4/1994 | MacKenzie | 361/96 |
| 5,452,223 | 9/1995 | Zuercher et al. | 364/483 |
| 5,510,946 | 4/1996 | Franklin | 361/56 |
| 5,519,561 | 5/1996 | Mrenna et al. | 361/105 |
| 5,583,732 | 12/1996 | Seymour et al. | 361/93 |

*Primary Examiner*—Jeffrey A. Gaffin
*Assistant Examiner*—Michael Sherry
*Attorney, Agent, or Firm*—Richard A. Menelly; Carl B. Horton

[57] ABSTRACT

A circuit breaker thermal-magnetic trip unit for arcing fault detection includes a current transformer having a gapped magnetic core arranged around the load side of the trip unit. The bimetal within the trip unit is positioned abutment with the gap in the transformer core to thereby heat the bimetal causing the bimetal to trip and separate the circuit breaker contacts.

10 Claims, 2 Drawing Sheets

RESIDENTIAL CIRCUIT BREAKER WITH ARCING FAULT DETECTION

BACKGROUND OF THE INVENTION

Circuit breakers currently used to protect residential environments are described in U.S. Pat. No. 4,513,268 entitled "Automated Q-Line Circuit Breaker". In the aforementioned patent, trip units in the form of combined thermal and electromagnetic sensors are used to determine the presence of overcurrent conditions and to release an operating mechanism to separate the circuit breaker contacts.

When it is desired to detect and interrupt conditions, such as so-called "arcing faults", that may be harmful to the protected circuit but are not readily sensed by thermal and electromagnetic trip units, electronic circuits such as described in U.S. Pat. No. 5,307,230 entitled "Circuit Breaker With Protection Against Sputtering Arc Faults", U.S. Pat. No. 5,452,223 entitled "Arc Detection Using Current Variation", U.S. Pat. No. 5,510,946 entitled "Circuit Breaker Protection Against 'Arc Short Circuit' Hazards" and U.S. Pat. No. 5,519,561 entitled "Circuit Breaker Using Bimetal of Thermal-Magnetic Trip to Sense Current" are proposed.

In view of the economic advantages with thermal-magnetic trip units along with long term dependability, it would be desirable to incorporate arcing fault protection within such thermal-magnetic trip units without incurring substantial costs.

One purpose of the invention is to describe a thermal-magnetic trip unit having means incorporated therein for sensing arcing faults and interrupting the protected circuit immediately upon detection thereof.

SUMMARY OF THE INVENTION

A circuit breaker thermal-magnetic trip unit includes a current transformer having a gapped magnetic core arranged around the load side of the trip unit. The load strap connecting with the trip unit constitutes the transformer primary winding and the secondary winding is in the from of a shorted single turn conductor. The bimetal within the trip unit is positioned abutment with the gap in the transformer core. The energy originating in the arcing fault simultaneously generates arcing conditions within the gap to thereby heat the bimetal causing the bimetal to trip and separate the circuit breaker contacts.

DESCRIPTION OF THE PREFERRED EMBODIMENT

Figure 1:
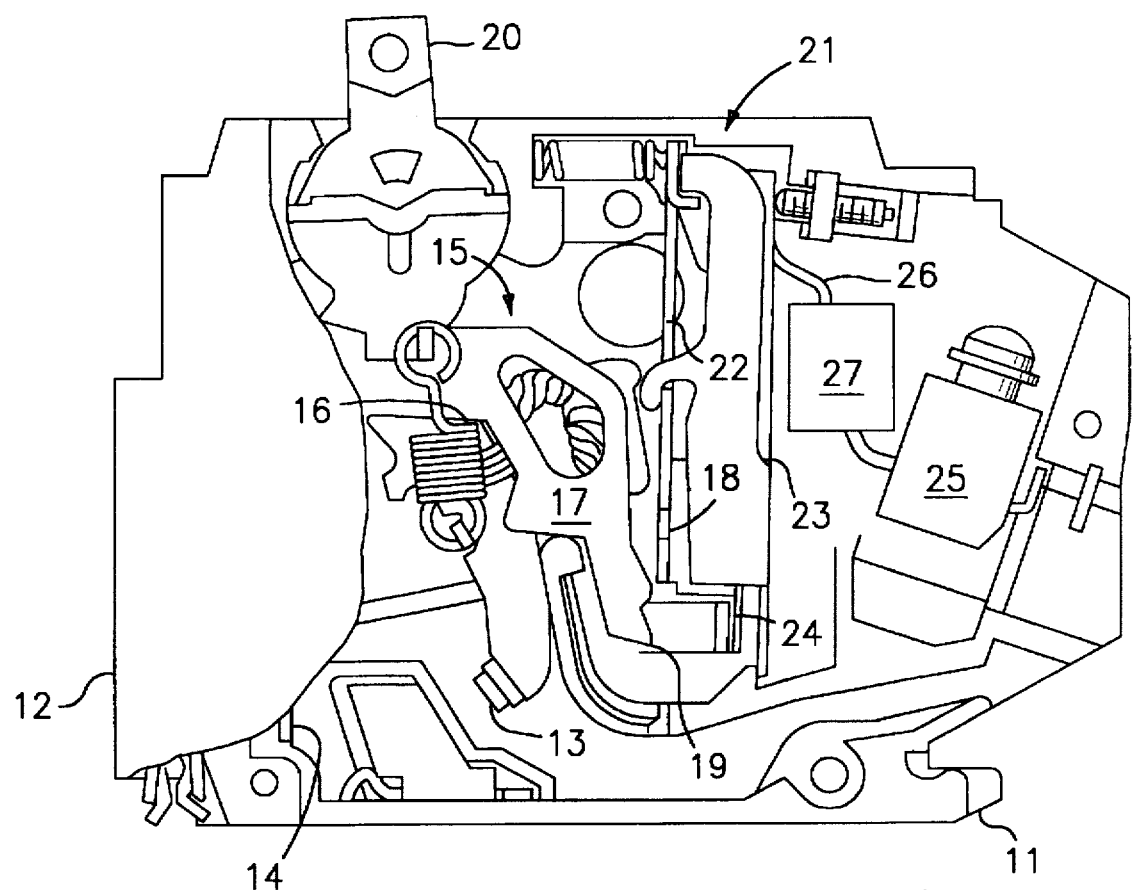
FIG. 1 is a front view of a circuit breaker containing the thermal-magnetic arcing detection trip unit according to the invention.
Figure 2:
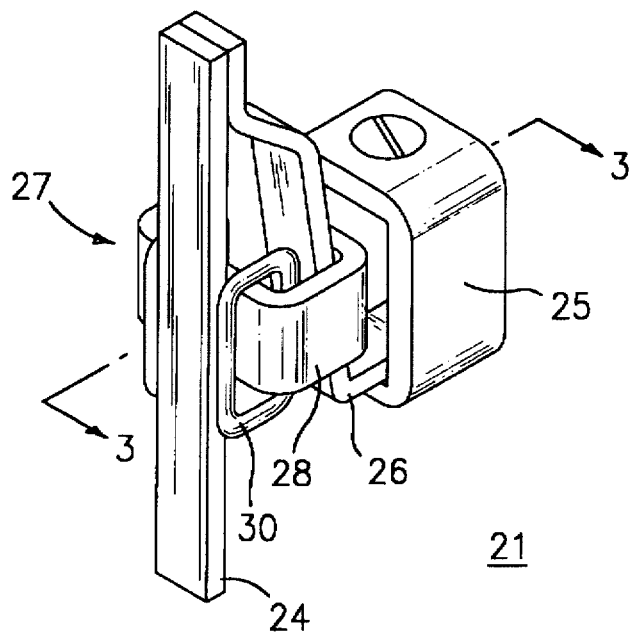
FIG. 2 is an enlarged front perspective view of the thermal-magnetic arcing detection trip unit of FIG. 1.
Figure 3:
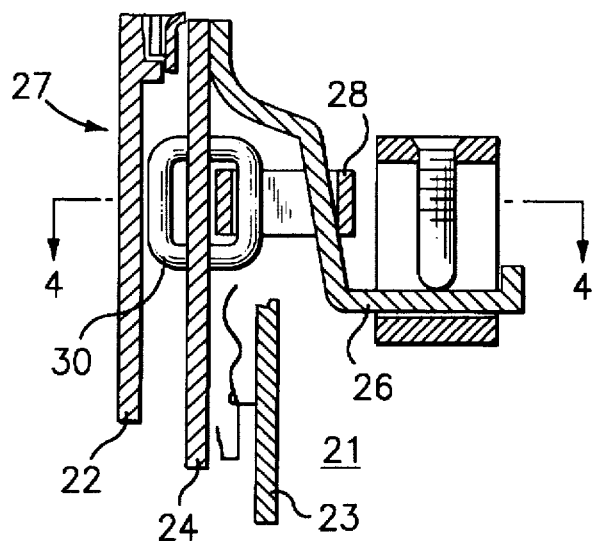
FIG. 3 is a side view in partial section of the thermal-magnetic arcing detection trip unit of FIG. 2.

A residential circuit breaker 10 is shown in FIG. 1 to consist of a molded plastic case 11 and a molded plastic cover 12. A pair of contacts 13, 14 are controlled by an operating mechanism 15 that includes an operating spring 16 and cradle 17 that interact with a latch slot 18 formed at the bottom of an armature 22 by means of a cradle hook 19 as described in the aforementioned U.S. Pat. No. 4,513,268. An externally-accessible operating handle 20 allows for manual operation of the contacts for both opening, closing and resetting operations. The thermal-magnetic arcing detecting trip unit 21, hereafter "TMAD trip unit", is similar to that described in aforementioned U.S. Pat. No. 4,513,268 wherein a load strap 26 connects between a load lug 25 and a bimetal 24. A magnet 23 and associated armature 22 provide so-called short term overcurrent protection within an electric circuit while the bimetal 24 serves to provide the so-called long "term overcurrent protection in the usual manner. The magnet 23 is in the form of an elongated plate partially arranged about the bimetal 24. In accordance with the invention, an arcing fault sensor 27 is arranged about the load strap 26 in the manner best seen by now referring to both FIG. 2 and FIG. 3, wherein the TMAD trip unit 21 consisting of the arcing fault sensor 27 is shown assembled to the load lug 25 by encircling the load strap 26 with an arcing transformer core 28 in the manner of a current transformer having the load strap as the primary winding conductor. The arcing transformer core 28 is in the form of a band of magnetic laminations or a continuos wrapping of amorphous core material. The secondary winding conductors 30 are in the form of closed loops and are arranged on either side of the bimetal 24 between the magnet 23 and the armature 22.

Figure 4:
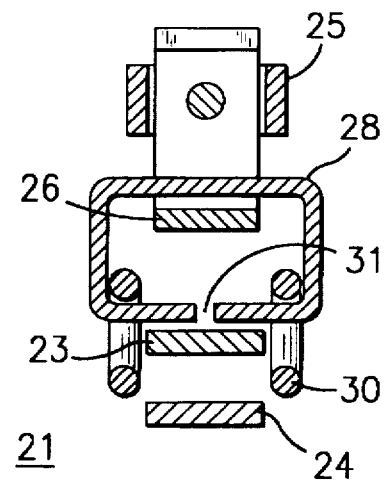
FIG. 4 is a top plan view of a part of the thermal-magnetic arcing detection trip unit of FIG. 3.

As shown in FIG. 4, the TMAD trip unit 21 is arranged such that the predetermined air gap 31 in the arcing transformer core 28 is positioned next to the bimetal 24. As earlier described, the secondary winding conductors 30 comprise closed loops about the transformer core such that circuit current passing from the load lug 25 through the load strap 26 induces current in the secondary winding conductors 30. Upon the occurrence of an arcing fault, as defined within the aforementioned U.S. Pat. No. 5,307,230 for example, higher frequency arcing currents at higher current densities are experienced with arcing fault conditions within the associated electric circuit. The increased current density results in high frequency flux generated within the arcing transformer core 28 resulting in energy transfer across the predetermined air gap 31. The increased energy in the vicinity of the bimetal 24 causes the bimetal to become heated and flexed to interrupt the circuit current upon the occurrence of an arcing fault while the current transfer through the bimetal is below that required to cause a circuit interruption. Accordingly, upon occurrence of an arcing condition within the electric circuit, energy generated within the gap energizes the bimetal causing the bimetal to articulate the circuit breaker operating mechanism.

Under quiescent circuit current transfer through the TMAD trip unit 21 there is no energy transfer across the predetermined air gap such that the bimetal 24 and magnet 23 operate to interrupt circuit current upon occurrence of long time and short time overcurrent conditions, as described earlier.

I claim:

1. A circuit breaker trip unit having arcing fault response comprising:

an angulated metal strap having a first end adapted for connection with an electric circuit;

a bimetal connected to a second end of said strap and arranged for interaction with a circuit breaker operating mechanism;

an arcing transformer core arranged about said strap, said arcing transformer core defining a gap proximate said bimetal, said strap providing a primary winding to said arcing transformer core; and a secondary winding on said arcing transformer core whereby upon occurrence of an arcing condition within said electric circuit, energy generated within said gap energizes said bimetal causing said bimetal to articulate said operating mechanism.

2. The circuit breaker trip unit of claim 1 including a magnet proximate said strap and an armature in magnetic relation with said magnet whereby circuit current through said strap excites said magnet and attracts said armature in response to excess circuit current.

3. The circuit breaker trip unit of claim 2 wherein said magnet comprises an elongated metal plate at least partially arranged about said bimetal.

4. The circuit breaker trip unit of claim 2 wherein said arcing transformer core comprises a band of magnetic laminations.

5. The circuit breaker trip unit of claim 4 wherein said arcing transformer core comprises a continuous wrapping of amorphous core material.

6. A circuit breaker comprising:

a plastic enclosure;

a pair of contacts within said enclosure arranged for connection within an electric circuit;

an operating mechanism within said enclosure for separating said contacts upon occurrence of an overcurrent within said electric circuit;

an angulated metal strap having a first end adapted for connection with said electric circuit;

a bimetal connected to a second end of said strap and arranged for interaction with said circuit breaker operating mechanism;

an arcing transformer core arranged about said strap, said arcing transformer core defining a gap proximate said bimetal, said strap providing a primary winding to said arcing transformer core; and a secondary winding on said arcing transformer core whereby upon occurrence of an arcing condition within said electric circuit, energy generated within said gap energizes said bimetal causing said bimetal to articulate said operating mechanism.

7. The circuit breaker trip unit of claim 6 including a magnet proximate said strap and an armature in magnetic relation with said magnet whereby circuit current through said bimetal excites said magnet and attracts said armature in response to excess circuit current.

8. The circuit breaker trip unit of claim 7 wherein said magnet comprises an elongated metal plate at least partially arranged about said bimetal.

9. The circuit breaker trip unit of claim 7 wherein said arcing transformer comprises a band of magnetic laminations.

10. The circuit breaker trip unit of claim 7 wherein said arcing transformer comprises a continuous wrapping of amorphous core material.

* * * * *